United States Patent
Hain et al.

(10) Patent No.: US 11,015,692 B2
(45) Date of Patent: May 25, 2021

(54) GEARING HAVING AN ELASTIC GEAR

(71) Applicant: Schaeffler Technologies AG & Co. KG, Herzogenaurach (DE)

(72) Inventors: Bastian Hain, Creglingen (DE); Peter Zierer, Grossenseebach (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 569 days.

(21) Appl. No.: 15/759,352

(22) PCT Filed: Sep. 7, 2016

(86) PCT No.: PCT/DE2016/200419
§ 371 (c)(1),
(2) Date: Mar. 12, 2018

(87) PCT Pub. No.: WO2017/041800
PCT Pub. Date: Mar. 16, 2017

(65) Prior Publication Data
US 2018/0252305 A1 Sep. 6, 2018

(30) Foreign Application Priority Data
Sep. 10, 2015 (DE) ............... 10 2015 217 304.6

(51) Int. Cl.
*F16H 1/32* (2006.01)
*F16H 49/00* (2006.01)
*F01L 1/352* (2006.01)

(52) U.S. Cl.
CPC ............ *F16H 49/001* (2013.01); *F01L 1/352* (2013.01); *F01L 2001/3521* (2013.01)

(58) Field of Classification Search
CPC ........................................... F16H 49/001
USPC ............................................. 74/640
See application file for complete search history.

(56) References Cited

U.S. PATENT DOCUMENTS

| 4,770,059 A | * | 9/1988 | Beyer .............. F16H 49/001 74/640 |
| 4,784,015 A | | 11/1988 | Schumacher |
| 9,840,947 B2 | | 12/2017 | Kohrs et al. |
| 2003/0115983 A1 | | 6/2003 | Wang et al. |
| 2015/0285356 A1 | | 10/2015 | Kurogi et al. |

FOREIGN PATENT DOCUMENTS

| CN | 102312987 A | | 1/2012 |
| DE | 3815118 | * | 11/1989 |
| DE | 102013216183 | | 2/2015 |
| DE | 102013220220 | | 4/2015 |
| DE | 102013220221 | | 4/2015 |
| DE | 112013004707 | | 6/2015 |
| EP | 0 130 763 | * | 1/1985 |

(Continued)

*Primary Examiner* — William C Joyce
(74) *Attorney, Agent, or Firm* — Volpe Koenig

(57) ABSTRACT

A gearing (1), in particular a strain wave gearing, including an elastic gear (2) having a flange (16), which flange is fastened to a housing component (7) of the gearing (1). A connecting assembly (8) for retaining the flange (16) on the housing component (7) includes a plurality of fastening points (14), wherein, outside of the fastening points (14), the connecting assembly (8) has axial play between the flange (16) and the housing component (7), with respect to the center axis (M) of the gear (2).

7 Claims, 2 Drawing Sheets

(56) References Cited

FOREIGN PATENT DOCUMENTS

| | | | |
|---|---|---|---|
| EP | 0130763 | | 1/1985 |
| EP | 0514829 | | 11/1992 |
| EP | 0741256 | | 11/1996 |
| JP | S61-022953 U | | 2/1986 |
| JP | H02-067405 A | | 3/1990 |
| JP | H03-134345 A | | 6/1991 |
| JP | 2003-176857 A | | 6/2003 |
| JP | 2007-016838 A | | 1/2007 |
| JP | 2010-127453 | * | 6/2010 |
| JP | 2015-145646 A | | 8/2015 |
| SU | 542305 | | 3/1977 |
| SU | 842305 | | 6/1981 |

* cited by examiner

GEARING HAVING AN ELASTIC GEAR

BACKGROUND

The invention relates to gearing having at least one elastic gear, in particular, strain wave gearing, for an electrical camshaft adjuster or a device for adjusting the compression (VCR=variable compression ratio) of an internal combustion engine, wherein the gear has a flange provided for fastening to a housing component.

Gearing according to the class, which has an elastic gear, is known, for example, from EP 0 741 256 B1. Another gearing with a flexible gear, in this case designated as a flexible bowl element, is disclosed in EP 0514 829 B1. In both cases, the flexible gear has a thick hub area that can be fastened to a housing component of the gearing, wherein a plurality of fastening points is provided. The flexibility of the gear is achieved by areas of thin cross section within the gear. This known gearing is intended for use in small robots or precision machines.

SUMMARY

The invention is based on the objective of refining gearing with an elastic gear, in particular, strain wave gearing, with respect to the specified prior art, wherein the gearing can be used, in particular, as speed reduction gearing in an electric camshaft adjuster of an internal combustion engine and in this way is to combine a compact construction with a reliable function. Likewise, the gearing should be usable in a device for changing the compression of an internal combustion engine, namely a reciprocating piston engine.

This objective is achieved according to the invention by gearing that includes one or more features of the invention. This gearing having at least one elastic gear comprises a housing component on which the elastic gear is fastened. The elastic gear can have a pot-like shape, wherein it can be part of a pot-shaped gearing.

A radially outward directed flange of the gear is held on the housing component by a connecting assembly that has multiple fastening points, in particular, threaded-connection points. Outside of the fastening points there is axial play between the flange and the housing component with respect to the center axis of the gear. Preferably, the gear can be deflected, starting from the mechanically non-loaded state, in both axial directions due to the axial play. In total, the elastic gear is thus held on the housing component without play in the circumferential direction and simultaneously with play in the axial direction. In this context, the axial play is not to be understood such that a displacement of the gear in the axial direction is possible without any effect of force. Instead, axial movements of sections of the gear, that is, of sections outside of the fastening points, are indeed possible under the effect of force, but with significantly less force than other displacements or deformation, especially in the circumferential direction.

The elastic gear held on the housing with directionally dependent stiffness has, in the preferred construction, a cylindrical, toothed section connecting to the section extending outward in the radial direction. The teeth of the cylindrical section are preferably external teeth that mesh with housing-fixed internal teeth of the gearing. The elastic gear formed from two sections, namely a cylindrical section and a flat, annular section, is also designated as an angle ring.

The wall thickness of the cylindrical section of the gear, measured outside of the teeth, matches the wall thickness of the flange in embodiments that are advantageous with respect to production. In particular, the flange is also not thicker in the area of the fastening points. In an especially economical way, the gear can be produced as a one-piece sheet-metal part. It is not necessary to form targeted thinner material sections for producing flexibility in the axial direction.

The section, i.e., flange, extending in the radial direction and lying essentially in a single plane of the elastic gear can be held on the housing component with the help of bolts, wherein intermediate parts, for example, in the form of disks or more complexly shaped spacers can be inserted between the bolts, the flange, and the housing component for producing the axial play. The entire flange is preferably flat. Alternatively, the flange can have a corrugated shape, which contributes, on one hand, to an increased flexibility in the axial direction, but, on the other hand, can also reduce the stiffness in the circumferential direction.

The housing component on which the elastic gear is fastened can be a drive wheel of the gearing that can be driven by a traction mechanism. Otherwise, such a drive wheel is preferably connected locked in rotation with the specified housing component.

In the preferred construction, there is axial play both radially within the fastening points, that is, in areas that are less spaced apart from the center axis of the gear than the fastening points, and also in circumferential section between the fastening points. Here, the circumferential sections, in which there is axial play between the flange and the housing component, extend over a total of at least 85%, that is, at least 306°, of the circumference of the flange.

The target conflict existing between the stiffness desired in the circumferential direction and the flexibility desired in the axial direction in the connection of the elastic gear to the housing can be achieved especially well by embodiments in which there are five or more fastening points, for example, exactly five fastening points.

The advantage of the invention is, in particular, that an especially high precision with respect to the transfer of rotational movements is achieved by the partial decoupling of an elastic gear of gearing with respect to the gearing housing exclusively in the axial direction, wherein deformation caused by operation of a toothed, cylindrical section of the gear is possible unhindered in the radial direction.

The gearing according to the application is especially well suited for use in an electric camshaft adjuster with an electrically driven regulating shaft. For example, in this context, refer to documents DE 10 2013 220 220 A1 and DE 10 2013 220 221 A1. Likewise, the gearing can be used in a device that is used for setting a variable compression in a reciprocating piston machine.

BRIEF DESCRIPTION OF THE DRAWINGS

Below, an embodiment of the invention will be explained in more detail with reference to a drawing. Shown herein, partially as schematics, are.

DETAILED DESCRIPTION

Figure 1:
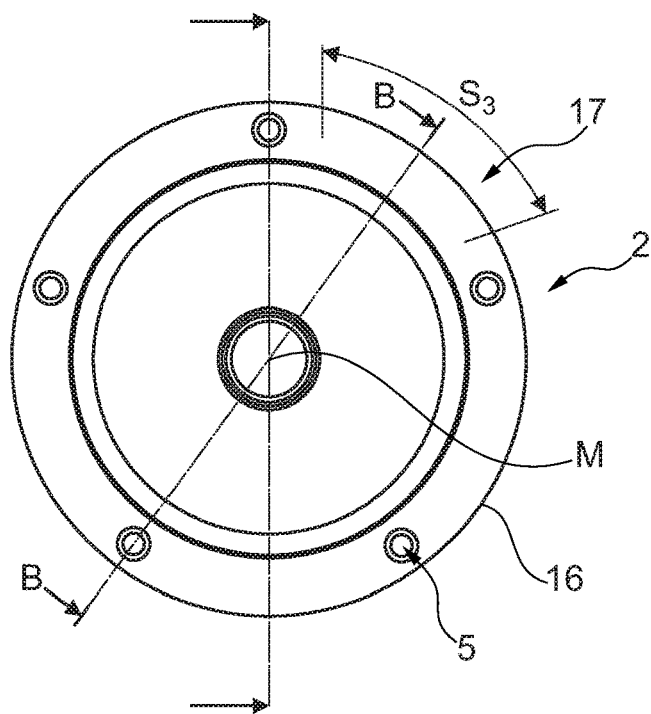
FIG. 1 an end-side plan view of an elastic gear of gearing, namely strain wave gearing, and FIGS. 2, 3 different sections through the strain wave gearing having the gear according to FIG. 1.
Figure 2:
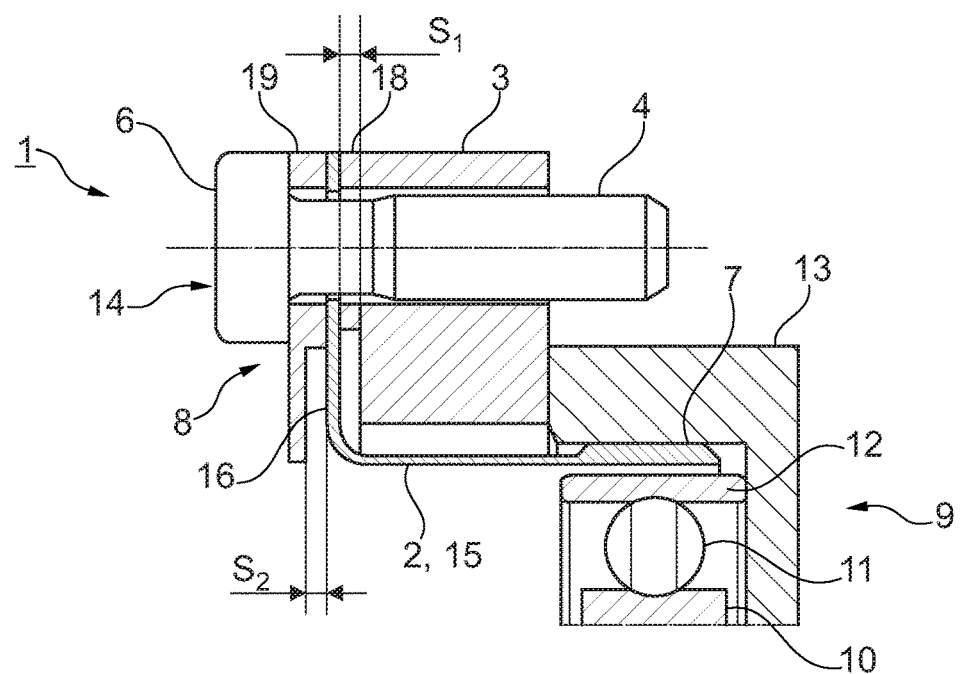
Figure 3:
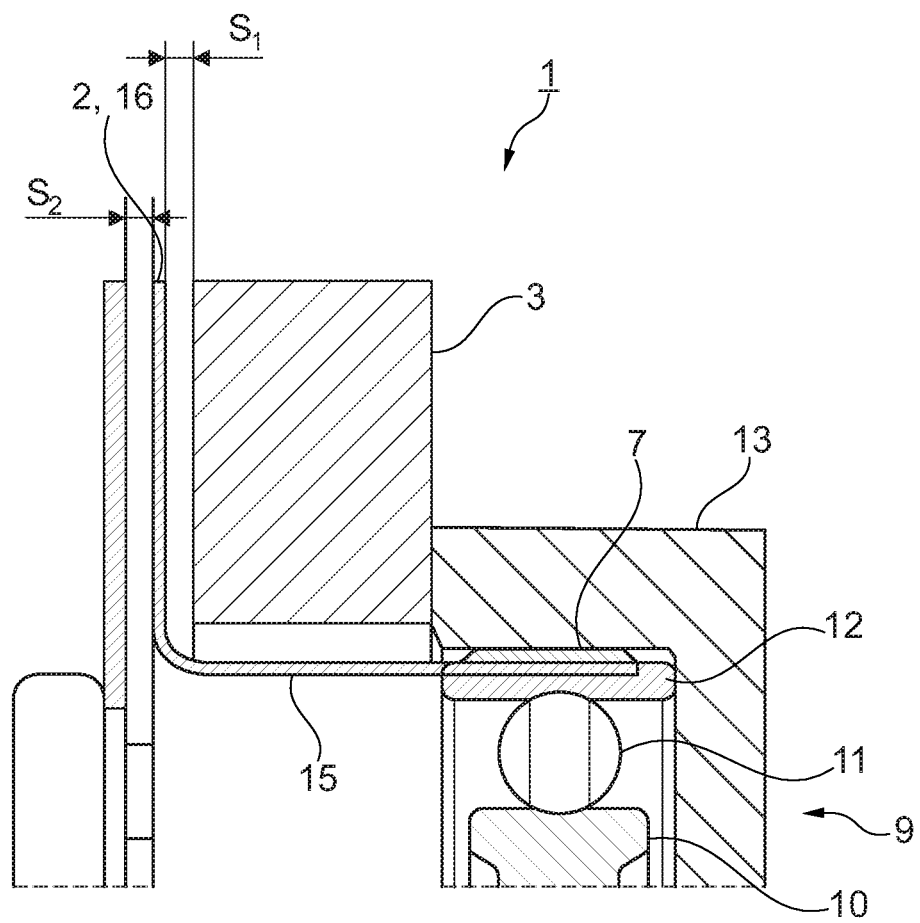

FIGS. 1 to 3 show an embodiment of gearing marked as a whole with the reference symbol 1, which is constructed as strain wave gearing and has an elastic gear 2. The gearing 1 is part of an electric camshaft adjuster of an internal combustion engine as gearing with a high degree of speed reduction. With respect to the principle function of the gearing 1, refer to the cited prior art.

The gearing 1 has a housing component 3 that is driven directly or indirectly by a not-shown traction mechanism, that is, a belt or a chain, by the crankshaft of the internal combustion engine, i.e., a gasoline or diesel engine. The rotational movement of the housing component 3 is transferred without play, with reference to the circumferential direction, to the elastic gear 2 with the help of bolts 4 that are fastened in the drive wheel 3. Recesses 5 of the gear 2 through which a bolt 4 is inserted have a circular shape. Bolt heads of the bolts 4 are designated with 6. In total, the gearing 1 has five bolts 4 for fastening the gear 2 to the housing component 3.

The connecting assembly marked as a whole with the reference symbol 8 between the gear 2 and the housing component 3 of the gearing 1 is constructed such that play designated with $S_1$ and $S_2$ in the axial direction exists with respect to the center axis designated with M in the gear 2. In this way, deformation of the elastic gear 2 can be absorbed.

The deformation of the elastic gear 2 is produced by a strain wave generator that is designated with 9 and has an outer ring designated with 12 and an elliptical inner ring 10. The outer ring 12 adapts in each operating state to the elliptical shape of the inner ring 10. The elastic gear 2 directly surrounds, in turn, the outer ring 12 under adaptation to its non-circular shape. As rolling bodies, balls 11 roll between the bearing rings 10, 12, i.e., the inner ring 10 and the outer ring 12, of the wave generator 9. The outer ring 12 assuming an elliptical shape presses the elastic gear 2 at two diametrically opposite points against an internal toothed driven wheel 13. This is connected, in turn, locked in rotation to a camshaft of the internal combustion engine.

The elastic gear 2 has a cylindrical, toothed section 15 and an adjoining section 16 extending outward in the radial direction, i.e., a flange, wherein the recesses 5 are located in the flange 16. The teeth designated with 7, namely external teeth, of the gear 2 are located on the cylindrical section 15. The inner ring 10 of the wave generator 9 is set in rotation by a not-shown electrical drive device. The wave driving the inner ring 10 is a regulating shaft; the gearing 1 as a whole is a three-shaft gearing.

The cross section according to FIG. 2 is set through one of the bolts 4 while the cross section according to FIG. 3 shows an open circumferential section 17 of the flange 16. This circumferential section 17 extends over an angle range of more than 45° designated with $S_3$.

In total, the gearing 1 has five open circumferential sections 17 corresponding to the number of bolts 4. Between every two circumferential sections 17 there is a fastening point designated with 14 and shown in FIG. 2. The flange 16 contacts the housing component 3 only at the fastening points 14, wherein the flange 16 is held on the housing component 3 by the bolt 4 with the intermediate arrangement of an intermediate piece 18 and an adapter 19. The adapter 19 is a single, ring-shaped part that is reinforced in the area of every fastening point 14. In contrast, the intermediate pieces 18 that are found between the flange 16 and the housing component 3 are individual washers through each of which a bolt 4 is inserted. The axial play $S_1$ on the side facing the housing component 3 and the axial play $S_2$ on the side facing away from the housing component 3 correspond to the thickness of the intermediate pieces 18 and the thicker section of the adapter 19 at the fastening points 14, respectively.

The connecting assembly 8 that is realized with the help of the fastening points 14 and the open circumferential sections 17 is provided to absorb deformation of the gear 2, without permitting play between the gear 2 and the housing component 3 in the circumferential direction of the specified parts. Due to the flexible—with reference to the axial direction—connection of the gear 2 to the housing component 3, the gear 2 does not require any significant elasticity that is generated, for example, by sections with reduced material thickness and that goes beyond the measure required for the functioning of the wave generator 9. The fastening points 14 realized by threaded connections can be alternatively constructed as welded connections.

LIST OF REFERENCE SYMBOLS

1 Gearing
2 Gear
3 Housing component
4 Bolt
5 Recess
6 Bolt head
7 Teeth
8 Connecting assembly
9 Wave generator
10 Inner ring
11 Ball
12 Outer ring
13 Driven wheel
14 Fastening point
15 Cylindrical, toothed section
16 Flange
17 Open circumferential section
18 Intermediate piece
19 Adapter
M Center axis
$S_1$, $S_2$ Play in the axial direction
$S_3$ Angle range of the open circumferential range

The invention claimed is:

1. Gearing comprising:
an elastic gear having a flange extending radially outwardly and a toothed section extending in a first axial direction from the flange, the toothed section defining external teeth,
a housing component on which the flange of the gear is fastened,
a connecting assembly that holds the flange on the housing component and includes a plurality of fastening points, the connecting assembly including:
a plurality of intermediate components formed as washers that are arranged on a first axial side of the flange in the first axial direction and contacting both the flange and the housing component, the plurality of intermediate components only being provided at the plurality of fastening points, and
an adapter contacting a second axial side of the flange, the plurality of intermediate components define a space that provides axial play between the flange and the housing component with respect to a center axis of the gear.

2. The gearing according to claim 1, wherein the flange has a same wall thickness as the cylindrical section outside of said external teeth.

3. The gearing according to claim 1, wherein the space which defines the axial play is provided radially between the fastening points and in circumferential sections between the fastening points.

4. The gearing according to claim 3, wherein the circumferential sections in which the space which defines the axial play is provided between the flange and the housing component extend in total for at least 85% of a circumference of the flange.

5. The gearing according to claim 1, wherein no more than five of the fastening points are provided.

6. The gearing according to claim 1, wherein the adapter is formed as a single, ring-shaped component that includes a base ring having thicker reinforcement regions in areas of the plurality of fastening points.

7. The gearing according to claim 1, wherein the plurality of intermediate components are arranged radially outward relative to the external teeth of the gear.

* * * * *